United States Patent
Goldschmidt et al.

(10) Patent No.: US 7,024,377 B1
(45) Date of Patent: Apr. 4, 2006

(54) METHOD AND APPARATUS FOR MANAGING ELECTRONIC COMMERCE

(75) Inventors: Jean Iki Goldschmidt, San Jose, CA (US); Anthony Alexander Shah-Nazaroff, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 992 days.

(21) Appl. No.: 09/632,640

(22) Filed: Aug. 4, 2000

Related U.S. Application Data

(63) Continuation of application No. 08/940,442, filed on Sep. 30, 1997, now abandoned.

(51) Int. Cl.
G06Q 30/00 (2006.01)

(52) U.S. Cl. .............. 705/26; 705/27; 705/14; 725/42

(58) Field of Classification Search ........... 705/26, 705/27

See application file for complete search history.

(56) References Cited

U.S. PATENT DOCUMENTS

| | | | | |
|---|---|---|---|---|
| 5,671,279 A | * | 9/1997 | Elgamal | 705/79 |
| 5,689,565 A | * | 11/1997 | Spies et al. | 713/189 |
| 5,715,314 A | * | 2/1998 | Payne et al. | 705/78 |
| 5,757,917 A | * | 5/1998 | Rose et al. | 705/79 |
| 5,778,173 A | * | 7/1998 | Apte | 713/201 |
| 5,848,161 A | * | 12/1998 | Luneau et al. | 705/78 |
| 5,898,777 A | * | 4/1999 | Tycksen et al. | 705/53 |
| 5,899,980 A | * | 5/1999 | Wilf et al. | 705/26 |
| 5,903,878 A | * | 5/1999 | Talati et al. | 705/26 |
| 5,974,146 A | * | 10/1999 | Randle et al. | 705/77 |
| 6,012,144 A | * | 3/2000 | Pickett | 713/201 |
| 6,088,683 A | * | 7/2000 | Jalili | 705/26 |

FOREIGN PATENT DOCUMENTS

WO   WO 99/35809   * 7/1999

OTHER PUBLICATIONS

Turbo-charged protocols: new chipsets are aimed at breaking network bottlenecks. (Internetworking Strategies); Harrison, Bradford T; LAN Computing, v3, n10, p27 (4), Oct. 1992.*

Fulfillment on the 'Net; Yoegel, Rob, Target Marketing v19n7 pp: 30-31, Jul. 1996.*

* cited by examiner

*Primary Examiner*—Yehdega Retta
(74) *Attorney, Agent, or Firm*—Blakely, Sokoloff, Taylor & Zafman LLP

(57) ABSTRACT

A method for managing electronic commerce includes storing consumer information. Transactional information is sent to a user. A request made by the consumer to make a transaction and the consumer information are securely forwarded to a party of the transaction.

42 Claims, 6 Drawing Sheets

METHOD AND APPARATUS FOR MANAGING ELECTRONIC COMMERCE

CROSS REFERENCE TO RELATED APPLICATIONS

This application is a continuation of U.S. application Ser. No. 08/940,442, filed Sep. 30, 1997,the priority of which is hereby claimed.

FIELD OF THE INVENTION

The present invention relates to the field of electronic commerce. More specifically, the present invention relates to a method and apparatus for managing electronic commerce.

BACKGROUND OF THE INVENTION

Commerce on the Internet is attracting enormous financial interest from businesses large and small. The Internet is attractive to businesses because it enables them to reach a large audience and generate an impressive presence regardless of the size of the business. For many businesses, Internet commerce involves a business running a server system that takes credit card orders from a customer running a client system over the Internet. Sending and receiving sensitive information over the Internet raises many security issues. Some of these security issues include maintaining privacy by insuring that the information is inaccessible to anyone but the sender and receiver, and guaranteeing non-fabrication by insuring that the receiver is genuine.

Several software programs made available for client and server communication provide a Secure Socket Layer (SSL) protocol that employs a variety of standard encryption algorithms including the government and banking standard of Data Encryption Standard (DES) and several Rivest, Shamir, and Adleman (RSA) algorithms including RC4. SSL enables a client and server to exchange a secret number known as a Master_Key. After the Master_Key is shared, the client and server use the Master_Key to create a different set of keys called Session Keys. These keys are used with a specified cryptographic algorithm to encrypt and decrypt the contents of the communication session.

Even with the security measures provided through the SSL protocol in client and server software, communications between clients and servers are not unbreakable. Furthermore, regardless of how labor intensive the SSL protocol makes for an intruder to break an encrypted message between a client and server, the SSL protocol fails to provide a mechanism for insuring that the receiver is a genuine business.

SUMMARY

A method for managing electronic commerce according to a first embodiment of the present invention is disclosed. Consumer information is stored. A request made by the consumer to make a transaction and the consumer information is securely forwarded to a party in the transaction.

BRIEF DESCRIPTION OF THE DRAWINGS

The present invention is illustrated by way of example and not by way of limitation in the figures of the accompanying drawings, in which like references indicate similar elements and in which.

DETAILED DESCRIPTION

Figure 1:
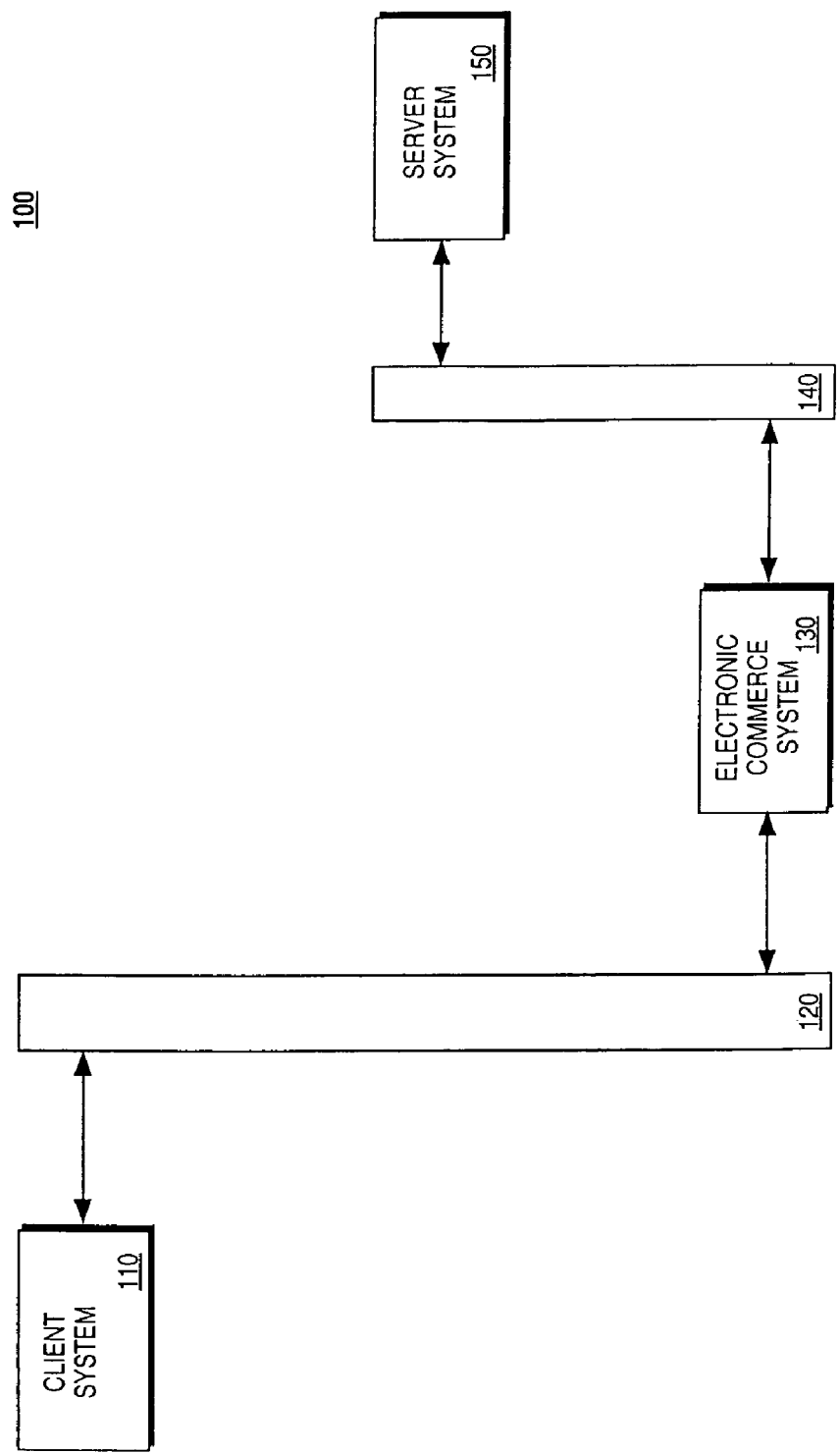
FIG. 1 is a block diagram illustrating a network in which an embodiment of the present invention is implemented.

FIG. 1 is a block diagram illustrating a network in which an embodiment of the present invention is implemented. Block 110 represents a client system. Block 130 represents an electronic commerce system. Block 150 represents a server system. The client system 110 and the electronic commerce system 130 are coupled to a first transmission medium 120. The electronic commerce system 130 and the server system 150 are coupled to a second transmission medium 140.

According to an embodiment of the present invention, sending data on the first transmission medium 120 is insecure because the data may be monitored and read by someone other than a sender or receiver of the data. According to one embodiment of the present invention, the transmission medium may be the Internet. When a user of the client system 110 wishes to transmit sensitive information to another location such as the server system 150, the client system 110 sends the request to the electronic commerce system 130 over the first transmission medium 120 without actually sending the sensitive information. The electronic commerce system 130 stores consumer information including sensitive information such as credit information corresponding to the user. According to one embodiment of the present invention, the electronic commerce system 130 forwards the sensitive information to the server system 150 securely over the second transmission medium 140 upon receiving the request from the client system 110. In this embodiment, the second transmission medium 140 may be a direct telephone connection. According to a second embodiment of the present invention, the electronic commerce system 130 encrypts the sensitive information and forwards the encrypted sensitive information securely over the second transmission medium 140 upon receiving a request from the client system 110. In this embodiment, the second transmission medium 140 may be the Internet.

According to an embodiment of the present invention, the electronic commerce system 130 includes an information distributor that sends transactional information to the client system 110. According to an alternate embodiment of the present invention, the server system 150 includes an information distributor that sends the transactional information to the client system 110. In this embodiment, the electronic commerce system 130 verifies that the server system 150 is genuine before forwarding the sensitive information to the server system 150 as requested by the client system 110.

Figure 2:
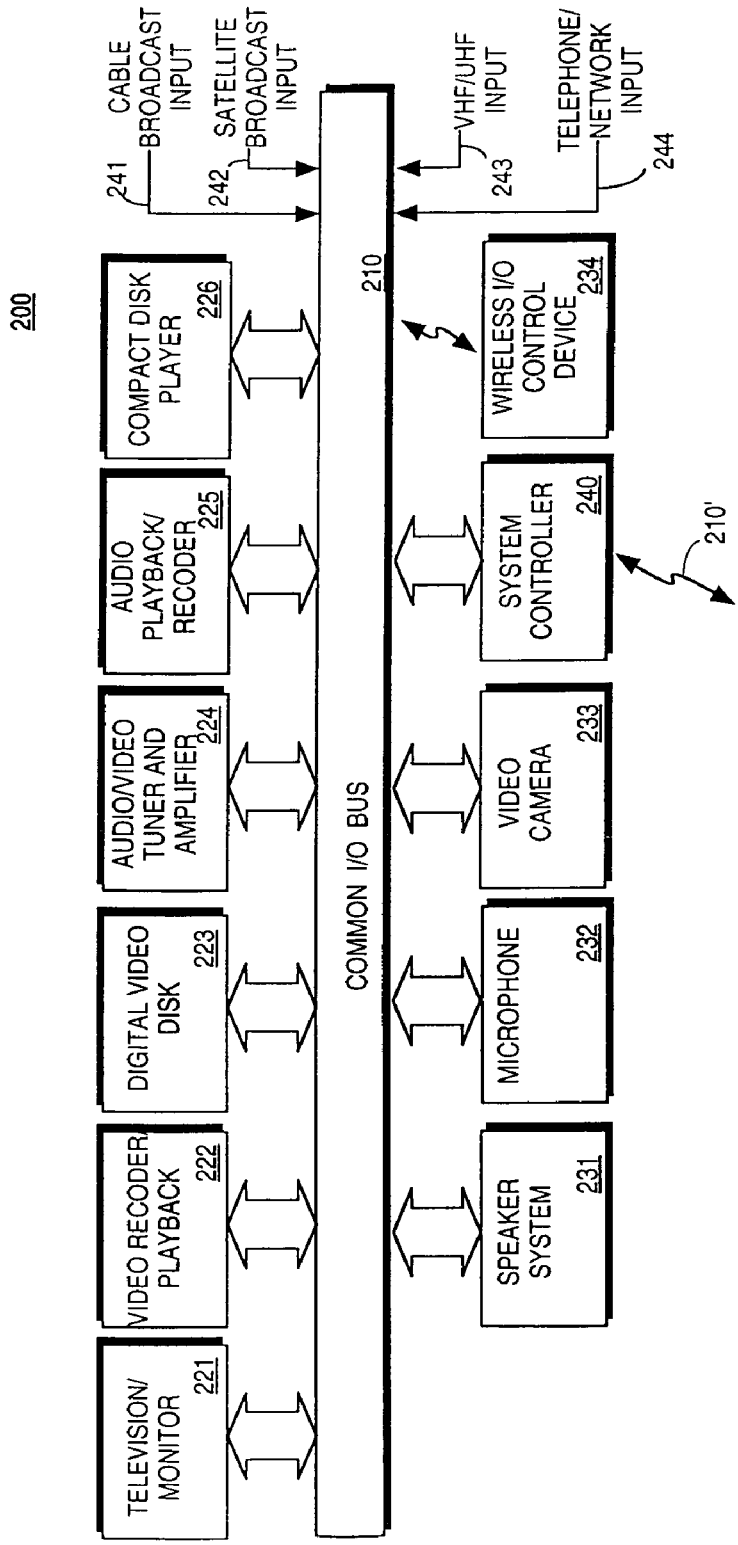
FIG. 2 is a block diagram illustrating the system components of one embodiment of a client system according to the present invention.

FIG. 2 is a block diagram illustrating system components of a client system 110 (shown in FIG. 1) according to one embodiment of the present invention. According to this embodiment, the client system 110 is an entertainment system 200 that includes a common input/output (I/O) bus 210 that connects the system components in the entertainment system 200 together. It should be appreciated that the common I/O bus 210 is illustrated to simplify the routing of signals between the computer system components. The common I/O bus 210 may represent a plurality of known mechanisms and techniques for routing I/O signals between the computer system components. For example, the common I/O bus 210 may include an appropriate number of independent audio "patch" cables that route audio signals, coaxial cables that route video signals, two-wire serial lines or infrared or radio frequency transceivers that route control signals, or other routing mechanisms that route other signals.

In the illustrated embodiment, the entertainment system 200 includes a television/monitor 221, video recorder/playback device 222, digital video disk (DVD) recorder/playback device 223, audio/video tuner and amplifier 224, audio playback/recorder device 225, and compact disk player 226 coupled to the common I/O bus. The video recorder/playback device 222, DVD recorder/playback device 223, audio playback/recorder device 225, and compact disk player 226 may be single disk or single cassette devices, or alternatively may be multiple disk or multiple cassette devices.

In addition, the entertainment system 200 includes a speaker system 231, microphone 232, video camera 233, and a wireless I/O control device 234. In one embodiment, wireless I/O control device 234 is an entertainment system remote control unit which communicates with the components of the entertainment system 200 through IR signals. In another embodiment, wireless I/O control device 234 may be a wireless keyboard and cursor positioning device that communicates with the components of entertainment system 200 through IR signals or RF signals. In yet another embodiment, wireless I/O control device 234 may be an IR remote control device similar in appearance to a typical entertainment system remote control with the added feature of a track-ball, which allows a user to position a cursor on a display of the entertainment system 200.

The entertainment system 200 also includes a system controller 240. According to one embodiment of the present invention, the system controller 240 operates to receive transactional information from either the electronic commerce system 130 or the server system 150 along with broadcast data available from the server system 150 or other broadcast data sources. The transactional information is presented to a user of the entertainment system 200 during the viewing of broadcast data. The transactional information may be used by the user, for example, to purchase a product related to the user's viewing selection. According to another embodiment of the present invention, system controller 240 is configured to control a wide variety of features associated with each of the system components. As shown in FIG. 2, system controller 240 is coupled, either directly or indirectly, to each of the system components, as necessary, through I/O bus 210. In one embodiment, in addition to or in place of I/O bus 210, system controller 240 is configured with a wireless communication transmitter (or transceiver), which is capable of communicating with the system components via IR signals or RF signals 210'. Regardless of the control medium, the system controller 240 is configured to control one or more of the entertainment system components of the entertainment system 200, although it is understood that each of the components may be individually controlled with wireless I/O control device 234.

As illustrated in FIG. 2, entertainment system 200 may be configured to receive broadcast data from a wide variety of sources. In one embodiment, entertainment system 200 receives broadcast data from any or all of the following sources: cable broadcast 241, satellite broadcast 242 (e.g., via a satellite dish), very high frequency (VHF) or ultra high frequency (UHF) radio frequency communication of the broadcast networks 243 (e.g., via an aerial antenna), telephone/computer network interface 244, and/or information stored locally at system controller 240 or another component of the entertainment system 200. Further, it will be appreciated by one skilled in the art, that cable broadcast input 241, satellite broadcast input 242 and VHF/UHF input 243 may receive input from digital broadcast programming and digital cable programming. The broadcast data may be received by the entertainment system 200 via the audio/video tuner and amplifier 224, the system controller 240, or other system components or combination of system components.

Although the present invention is described in the context of the exemplary embodiments presented in the figures, those skilled in the art will appreciate that the present invention is not limited to these embodiments and may be practiced in a variety of alternate embodiments. Accordingly, the innovative features of the present invention may be practiced in a system of greater or lesser complexity than that of the system depicted in FIG. 2. For example, according to one embodiment, the client system 110 may be practiced using the system controller 240 alone.

Figure 3:
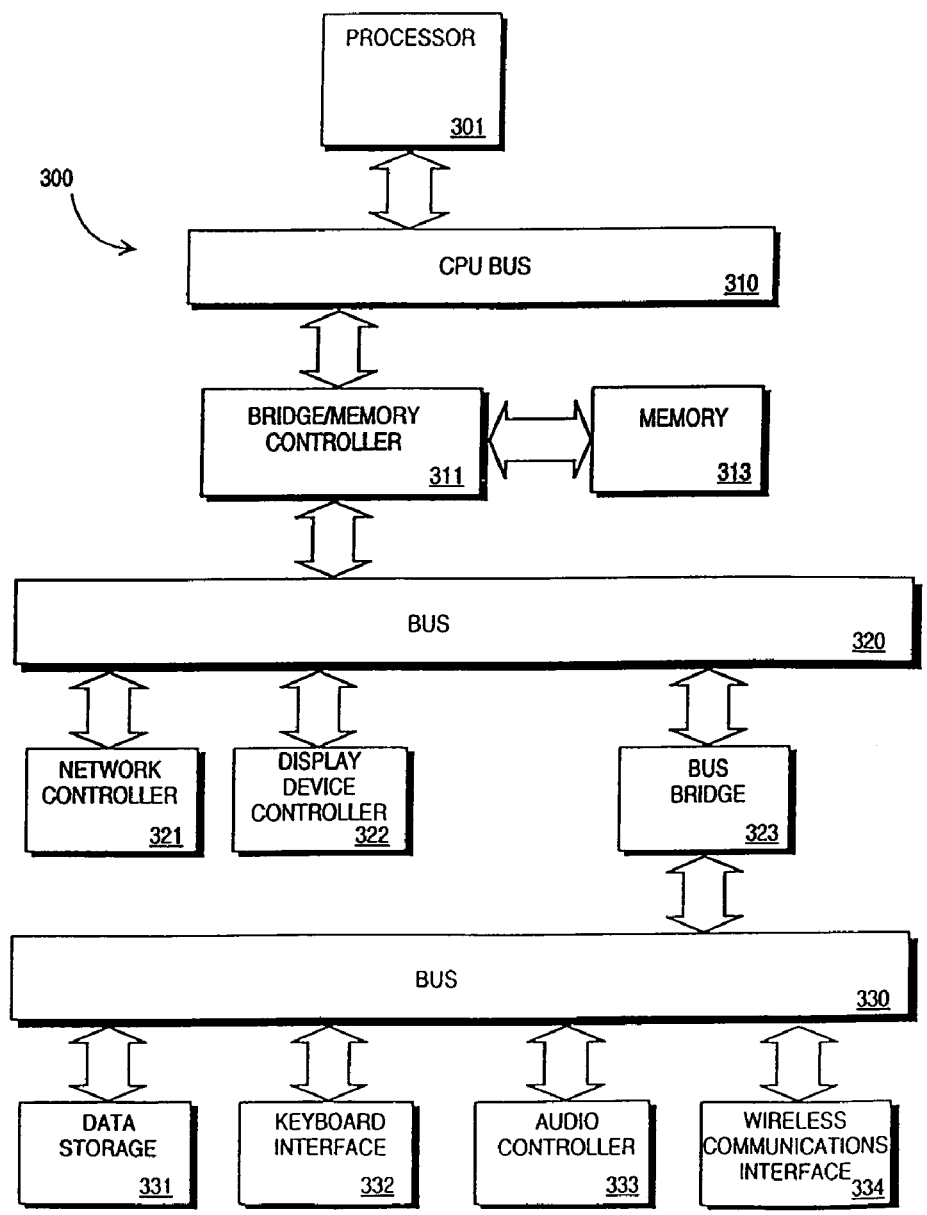
FIG. 3 is a block diagram illustrating one embodiment of a system controller according to the present invention.

FIG. 3 is a block diagram illustrating a computer system 300 that may be used to implement the electronic commerce system 130 (shown in FIG. 1). The computer system 300 includes a processor 301 that processes digital data signals. The processor 301 may be a complex instruction set computer (CISC) microprocessor, a reduced instruction set computing (RISC) microprocessor, a very long instruction work (VLIW) microprocessor, a processor implementing a combination of instruction sets, or other processor device. FIG. 3 shows an example of the present invention implemented on a single processor computer system 300. However, it is understood that the present invention may be implemented in a computer system having multiple processors. The processor 301 is coupled to a CPU bus 310 which transmits data signals between processor 301 and other components in the computer system 300.

As an example, memory 313 may be a dynamic random access memory (DRAM) device, a static random access memory (SRAM) device, or other memory device. The memory 313 stores information or other intermediate data signals that are executed by the processor 301. A cache memory 302 resides inside processor 301 that stores information or other intermediate data that is stored in memory 213. The cache 302 speeds up memory accesses by the processor 301 by taking advantage of its locality of access. In an alternate embodiment of the computer system 300, the cache 302 or a second cache resides external to the processor 301.

A bridge memory controller 311 is coupled to the CPU bus 310 and the memory 313. The bridge memory controller 311 directs data signals between the processor 301, the memory 313, and other components in the computer system 300 and bridges the data signals from these components to a first I/O bus 320.

The first I/O bus 320 may be a single bus or a combination of multiple buses. As an example, the first I/O bus 320 may be a high performance I/O bus that operates at high throughput rates. The first I/O bus 320 may include for example a Peripheral Components Interconnect (PCI) bus, a Personal Computer Memory Card International Association (PCM- CIA) bus, a NuBus, or other buses. The first I/O bus 320 provides communication links between components in the computer system 300. A network controller 321 links the computer system 300 to a network of computers and supports communication among the machines. A display device controller 322 is coupled to the first I/O bus 320. The display device controller 322 allows coupling of a display device to the computer system 300 and acts as an interface between the display device and the computer system 300. The display device controller may be a monochrome display adapter (MDA) card, a color graphics adapter (CGA) card, an enhanced graphics adapter (EGA) card, an extended graphics array (XGA) card or other display device controller. The display device may be a television set, a computer monitor, a flat panel display or other display device. The display device receives data signals from the processor 301 through the display device controller 322 and displays the information and data signals to the user of the computer system 300.

A second I/O bus 330 may be a single bus or a combination of multiple buses. The second I/O bus 330 may include an Industry Standard Architecture (ISA) bus, an Extended Industry Standard Architecture (EISA) bus, or other buses. The second I/O bus 330 provides communication links between components in the computer system 300. A keyboard interface 332 may be a keyboard controller or other keyboard interface. The keyboard interface 332 may be a dedicated device or can reside in another device such as a bus controller or other controller. The keyboard interface 332 allows coupling of a keyboard to the computer system 300 and transmits data signals from a keyboard to the computer system 300. A data storage device 331 may be a hard disk drive, a floppy disk drive, a CD-ROM device, a flash memory device or other mass storage device. An audio controller 333 operates to coordinate the recording and playing of sounds is also coupled to the I/O bus 330. A wireless communications interface 334 may be an IR transceiver or a RF transceiver for transmitting and receiving signals between system components of the entertainment system 200 (shown in FIG. 2).

A bus bridge 323 couples the first I/O bus 320 to the second I/O bus 330. The bus bridge 323 operates to buffer and bridge data signals between the first I/O bus 320 and the second I/O bus 330.

According to one embodiment, managing electronic commerce is performed by the computer system 300 in response to the processor 301 executing sequences of instructions contained in the memory 313. Such instructions may be read into the memory 313 from other computer-readable mediums such as data storage device 331 or from a computer connected to the network via the network controller 311. Execution of the sequences of instructions contained in the memory 313 causes the processor to manage electronic commerce, as will be described hereafter. In alternative embodiments, hard-wire circuitry may be used in place of or in combination with software instructions to implement the present invention. Thus, the present invention is not limited to any specific combination of hardware circuitry and software.

Figure 4:
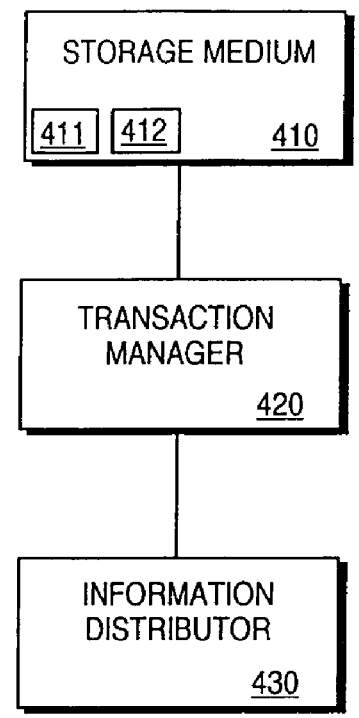
FIG. 4 is a block diagram of modules implementing an embodiment of an electronic commerce manager according to the present invention.

FIG. 4 is a block diagram illustrating an embodiment of modules of an electronic commerce manager 400 operating in the electronic commerce system 130 (shown in FIG. 1), according to the present invention. The modules may be implemented by software, hardware, or a combination of both hardware and software. The electronic commerce manager 400 includes a storage medium 410. The storage medium 410 includes a first library 411 that stores information relating to consumers. The information in the first library 410 may include names, addresses, phone numbers, credit information, identifiers, or other information corresponding to the consumers. The storage medium 410 includes a second library 412 that stores information relating to businesses that practice electronic commerce. The information in the second library 410 may include the names, physical addresses, Internet addresses, phone and fax numbers, products sold, or other information relating to the businesses. According to an embodiment of the present invention, the second library 410 stores information relating to genuine businesses practicing electronic commerce that have been verified by managers of the electronic commerce manager 400. The verification may be achieved, for example, by checking the history of the business, whether any complaints have been filed against the business, or by referencing other information relating to the business.

Figure 5:
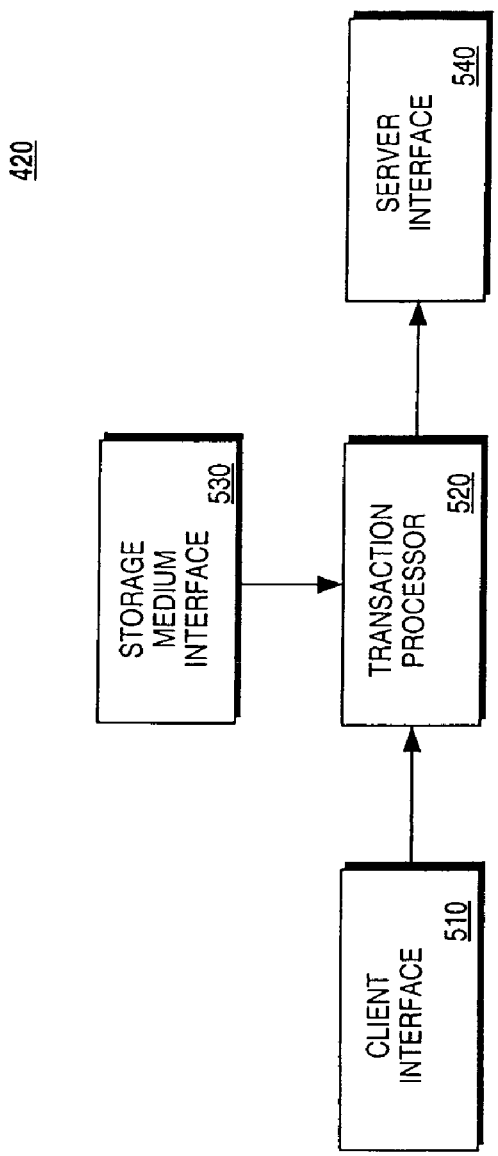
FIG. 5 is a block diagram of modules implementing an embodiment of a transaction manager according to the present invention.

A transaction manager 420 is coupled to the storage medium 410. As shown in FIG. 5, the transaction manager 420 includes a client interface 510, a transaction processor 520, a storage medium interface 530, and a server interface 540. The client interface 510 operates to receive a request to make a transaction from a client system 110 (shown in FIG. 1). The request may include an identifier (consumer identifier) corresponding to the user of the client system 110 who is a consumer, and a transaction identifier that identifies a business and a product sold by the business. The client interface 510 forwards the request to the transaction processor 520 coupled to the client interface 510.

The transaction processor 520 obtains information about the consumer making the request via the storage medium interface 530. The transaction processor 520 references the identifier received by the client system 110 (consumer identifier) with information in the first library 411 (shown in FIG. 4). The transaction processor 520 also verifies that the business the user wishes to engage in the transaction with is a genuine business via the storage medium interface 530. The transaction processor 520 references the transaction identifier received by the client system 110 with the information in the second library 412 (shown in FIG. 4). The transaction processor 520 forwards the information about the consumer and the transaction identifier to the server interface 540 coupled to the transaction processor 520.

The server interface 540 operates to securely forward the request to make a transaction and the information about the consumer to the server system 150 (shown in FIG. 1). According to one embodiment of the present invention, the server interface 540 is a telephone interface that operates to dial a direct telephone connection to the server system 150. A direct telephone connection provides a secure communication link where the risk of monitoring and reading of data traffic is reduced. According to a second embodiment of the present invention, the server interface 540 is an encryption unit and a network interface. The encryption unit encrypts the request and the information about the consumer before sending the request and the information over an Internet connection via the network interface. Encrypting the request and information reduces the chance that the request and information may be read by someone other than the sender or receiver. The present invention allows encryption to be performed on sensitive information and transmitted over the Internet without requiring a client system 110 to be configured with the necessary encryption hardware or software. The server interface 540 may securely forward the request to make a transaction and the information about the consumer to the server system 150 in real-time as the server interface 540 receives each request and information. In an alternate embodiment of the present invention, the server interface 540 may securely forward a plurality of requests and information using batch processing at a later time.

Referring back to FIG. 4, an information distributor 430 is coupled to the transaction manager 420. The information distributor 430 operates to distribute transactional information to the client system 110 (shown in FIG. 1). The transactional information may be, for example, information about a product or service that is for sale or other information. According to a first embodiment of the present invention, the information distributor 430 may be a network interface or a telephone interface that sends transactional information to the client system 110 over the Internet or over a direct phone connection. According to a second embodiment of the present invention where the electronic commerce system 130 is used for broadcasting broadcast data, the information distributor 430 may be a vertical blanking interval encoder, a cable link encoder, or a satellite link encoder that transmits transactional information over vertical blanking intervals, available cable bandwidth, or available satellite bandwidth during the transmission of broadcast data.

Figure 6:
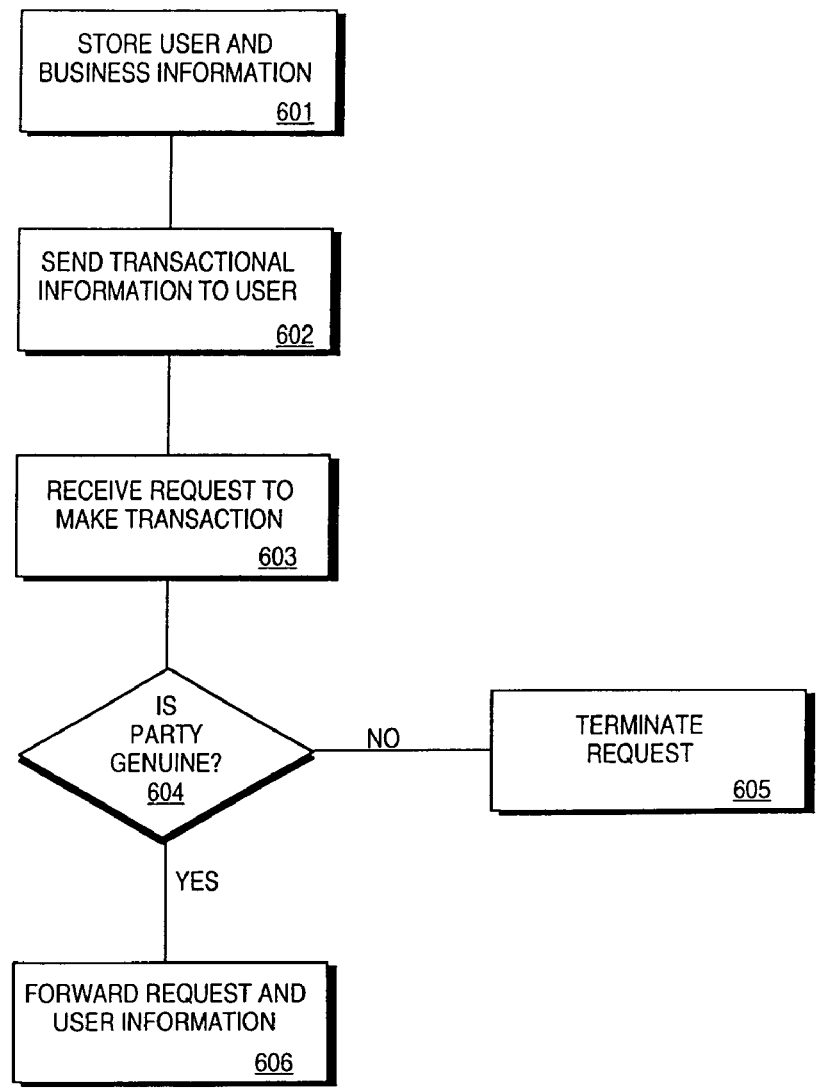
FIG. 6 is a flow chart illustrating a method for managing electronic commerce according to an embodiment of the present invention.

FIG. 6 is a flow chart that illustrates a method for managing electronic commerce according to an embodiment of the present invention. At step 601, user information and business information is stored. According to an embodiment of the present invention, consumer information is stored in a first library of a storage medium. The user information may include name, address, credit information, and an identifier corresponding to a consumer (consumer identifier). According to an embodiment of the present invention, business information is stored in a second library in the storage medium. The business information may include name, physical and Internet addresses, and product information corresponding to the business.

At step 602, transactional information is sent to the user. The transactional information may be, for example, information about a product that is for sale. According to an embodiment of the present invention, the transactional information is sent over the Internet to a user on a client system. It should be appreciated that the transactional information may be sent to the consumer via a direct phone connection, vertical blanking intervals of broadcast data, or via other communication mediums. According to an embodiment of the present invention, the transactional information is displayed to the consumer during the viewing of broadcast data by the user on a client system.

At step 603, a request to make a transaction is received from the consumer. According to an embodiment of the present invention, the user sends an identifier that identifies the consumer (consumer identifier) and a transaction identifier that identifies the transaction and a party of the transaction. According to an embodiment of the present invention, the identifier and the transaction identifier is sent by the consumer over the Internet.

At step 604, it is determined whether the party of the transaction is a genuine business. According to an embodiment of the present invention, the determination is made by referencing information in the second library of the storage medium that indicates whether the intended party of the transaction is a genuine business. If the party is a genuine business, control proceeds to step 606. If the party is not a genuine business, control proceeds to step 605.

At step 605, the request to make the transaction is terminated. According to an embodiment of the present invention, a message is sent to the user at the client system informing the consumer that the party is not a genuine business.

At step 606, the request made by the consumer to make a transaction and the consumer information corresponding to the consumer is securely forwarded to the party of the transaction. The request made by the user to make the transaction may be a request to purchase the product and the consumer information may be credit information belonging to the consumer. According to an embodiment of the present invention, the request and the consumer information is securely forwarded by transmitting the request and the consumer information over a direct phone connection. According to an alternate embodiment of the present invention, the request and the consumer information is encrypted and transmitted over the Internet.

In the foregoing specification, the invention has been described with reference to specific embodiments thereof. It will, however be evident that various modifications and changes may be made thereto without departing from the broader spirit and scope of the invention. The specification and drawings are, accordingly, to be regarded in an illustrative rather than a restrictive sense.

What is claimed is:

1. A method comprising:
sending transactional information via a broadcast channel from an electronic commerce system to consumers, the transactional information including a transaction identifier and relating to a product or service that is for sale by a business;
receiving a transaction request via a network connection at an electronic commerce system from a consumer in response to the sent transactional information, the transaction request including a transaction identifier and a consumer identifier;
sending the transaction request and consumer information via a secure channel from the electronic commerce system to a server system of the business to which the transactional information relates, the consumer information including credit information about the consumer and an identification of the consumer.

2. The method of claim 1 wherein sending transactional information comprises sending the transactional information along with broadcast data for viewing of broadcasts by the user.

3. The method of claim 2 wherein sending transactional information comprises sending transactional information that is related to the broadcast viewing data.

4. The method of claim 2 wherein sending the transactional information along with the broadcast data comprises sending using at least one of cable broadcast, satellite broadcast, very high frequency (VHF) radio frequency communication of broadcast networks, ultra high frequency (UHF) radio frequency communication of broadcast networks and a telephone/computer network interface.

5. The method of claim 1 wherein the network connection comprises an insecure internet connection.

6. The method of claim 1 wherein the secure channel comprises an encrypted internet connection.

7. The method of claim 1 wherein the secure channel comprises a telephone connection.

8. The method of claim 1 further comprising verifying the consumer by comparing the consumer identifier to a list of consumers in a consumers library.

9. The method of claim 8 wherein the consumers library includes credit information regarding consumers listed in the library and wherein sending the transaction request includes sending an identification of the consumer and credit information regarding the consumer.

10. The method of claim 1 further comprising verifying businesses by comparing the transaction identifier to a list of transaction identifiers in a businesses library.

11. The method of claim 10 further comprising verifying information for use in the businesses library by at least one of checking the history of the business and checking whether any complaints have been filed against the business.

12. The method of claim 10 wherein the business library contains at least one of the name of the business, the physical address of the business, the Internet address of the business, the phone and fax numbers of the business and products sold by the business.

13. The method of claim 1 wherein sending the transaction request comprises forwarding the transaction request to a server interface of the electronic commerce system to be sent to the server system of the business.

14. A machine readable medium having stored thereon data representing sequences of instructions which, when executed by a machine, cause the machine to perform operations comprising:
 sending transactional information via a broadcast channel from an electronic commerce system to consumers, the transactional information including a transaction identifier and relating to a product or service that is for sale by a business;
 receiving a transaction request via a network connection at an electronic commerce system from a consumer in response to the sent transactional information, the transaction request including a transaction identifier and a consumer identifier;
 sending the transaction request and consumer information via a secure channel from the electronic commerce system to a server system of the business to which the transactional information relates, the consumer information including credit information about the consumer and an identification of the consumer.

15. The medium of claim 14 wherein the instructions for sending transactional information comprise instructions for sending the transactional information along with broadcast data for viewing of broadcasts by the user.

16. The medium of claim 14 wherein the network connection comprises an insecure internet connection.

17. The medium of claim 14 wherein the secure channel comprises an encrypted internet connection.

18. The medium of claim 14 wherein the sequences of instructions, when executed by a machine, cause the machine to perform further operations comprising verifying the consumer by comparing the consumer identifier to a list of consumers in a consumers library.

19. The medium of claim 14 wherein the consumers library includes credit information regarding consumers listed in the library and wherein sending the transaction request includes sending an identification of the consumer and credit information regarding the consumer.

20. The medium of claim 14 wherein the sequences of instructions, when executed by a machine, cause the machine to perform further operations comprising further comprising verifying businesses by comparing the transaction identifier to a list of transaction identifiers in a businesses library.

21. A method comprising:
 sending transactional information along with broadcast data from an electronic commerce system to a consumer entertainment system through a broadcast communications medium, the transactional information including information about a product or service that is for sale by a business;
 receiving a transaction request at the electronic commerce system from the consumer entertainment system identifying the consumer and the transactional information;
 forwarding information regarding the consumer together with the identification of the consumer and the transactional information to a server system corresponding to the business for the transactional information securely over a second transmission medium.

22. The method of claim 21 wherein the information regarding the consumer includes credit information regarding the consumer.

23. The method of claim 21 wherein forwarding information securely comprises forwarding information using an encrypted internet connection.

24. The method of claim 21 wherein forwarding information securely comprises forwarding information using a telephone connection.

25. The method of claim 21 wherein displaying comprises displaying the transactional information during the viewing of broadcast data.

26. The method of claim 21 wherein sending transactional information comprises sending transactional information that is related to the broadcast viewing data.

27. The method of claim 21 wherein the broadcast communications medium comprises at least one of cable broadcast, satellite broadcast, very high frequency (VHF) radio frequency communication of broadcast networks, ultra high frequency (UHF) radio frequency communication of broadcast networks and a telephone/computer network interface.

28. The method of claim 21 wherein receiving a transaction request comprises receiving the transaction request through an insecure internet connection.

29. The method of claim 21 further comprising verifying the consumer by comparing the consumer identifier to a list of consumers in a consumers library.

30. The method of claim 29 wherein the consumers library includes credit information regarding consumers listed in the library and wherein sending the transaction request includes sending an identification of the consumer and credit information regarding the consumer.

31. The method of claim 21 further comprising verifying businesses by comparing the transaction identifier to a list of transaction identifiers in a businesses library.

32. The method of claim 21 wherein sending the transaction request comprises forwarding the transaction request to a server interface of the electronic commerce system to be sent to the server system of the business.

33. A machine readable medium having stored thereon data representing sequences of instructions which, when executed by a machine, cause the machine to perform operations comprising:
 sending transactional information along with broadcast data from an electronic commerce system to a consumer entertainment system through a broadcast communications medium, the transactional information including information about a product or service that is for sale by a business;
 receiving a transaction request at the electronic commerce system from the consumer entertainment system identifying the consumer and the transactional information;
 forwarding information regarding the consumer together with the identification of the consumer and the transactional information to a server system corresponding to the business for the transactional information securely over a second transmission medium.

34. The medium of claim 33 wherein the information regarding the consumer includes credit information regarding the consumer.

35. The medium of claim 33 wherein forwarding information securely comprises forwarding information using an encrypted internet connection.

36. The medium of claim 33 wherein sending transactional information comprises sending transactional information that is related to the broadcast viewing data.

37. The medium of claim 33 wherein the broadcast communications medium comprises at least one of cable broadcast, satellite broadcast, very high frequency (VHF) radio frequency communication of broadcast networks, ultra high frequency (UHF) radio frequency communication of broadcast networks and a telephone/computer network interface.

38. The medium of claim 33 wherein receiving a transaction request comprises receiving the transaction request through an insecure internet connection.

39. The medium of claim 33 further comprising verifying the consumer by comparing the consumer identifier to a list of consumers in a consumers library.

40. The medium of claim 39 wherein the consumers library includes credit information regarding consumers listed in the library and wherein sending the transaction request includes sending an identification of the consumer and credit information regarding the consumer.

41. The medium of claim 33 further comprising verifying businesses by comparing the transaction identifier to a list of transaction identifiers in a businesses library.

42. The medium of claim 33 wherein sending the transaction request comprises forwarding the transaction request to a server interface of the electronic commerce system to be sent to the server system of the business.

* * * * *